United States Patent [19]

Aldrich et al.

[11] Patent Number: 4,575,806

[45] Date of Patent: Mar. 11, 1986

[54] PRECISION TEMPERATURE MEASURING SYSTEM

[75] Inventors: Wilbert H. Aldrich, Winchester; Alan Rich, Haverhill; Dennis Picker, Arlington, all of Mass.

[73] Assignee: Gould, Inc., Rolling Meadows, Ill.

[21] Appl. No.: 362,059

[22] Filed: Mar. 26, 1982

[51] Int. Cl.[4] ............ G01K 7/02; G01R 5/22
[52] U.S. Cl. ............ 364/557; 324/105; 340/501; 374/172; 374/181
[58] Field of Search .......... 364/557, 571, 482; 340/500, 501, 870.17; 324/105; 374/172, 181, 182, 197

[56] References Cited

U.S. PATENT DOCUMENTS

| | | | |
|---|---|---|---|
| 3,766,782 | 10/1973 | Shimomura | 364/557 |
| 3,843,872 | 10/1974 | Shimomura | 364/557 |
| 4,102,199 | 7/1978 | Tsipouras | 364/557 |
| 4,114,447 | 9/1978 | Creach | 364/557 |
| 4,122,719 | 10/1978 | Carlson et al. | 374/172 X |
| 4,122,720 | 10/1978 | Podl | 364/557 X |
| 4,217,651 | 8/1980 | Pickering | 364/483 X |
| 4,276,603 | 6/1981 | Beck et al. | 364/557 X |
| 4,288,853 | 9/1981 | Uesugi | 364/557 |

OTHER PUBLICATIONS

Radio Electronics, Nov. 1981, "Expanded Scale Voltmeter", T. J. Byers, pp. 52–56.

Primary Examiner—Errol A. Krass
Assistant Examiner—Kevin J. Teska
Attorney, Agent, or Firm—Robert H. Ware; Melvin I. Stoltz; Alfred A. Fressola

[57] ABSTRACT

An improved system for precisely measuring temperatures at remote locations using a microprocessor and resistance temperature detectors is achieved by providing means for pre-selecting a particular temperature range and using this temperature range information to generate a comparison level for determining the measured temperature. By employing the present invention, the fixed number of bits used to produce the temperature information output is concentrated over a limited range of temperatures, thereby achieving greater precision, since each information bit represents a much smaller number.

7 Claims, 2 Drawing Figures

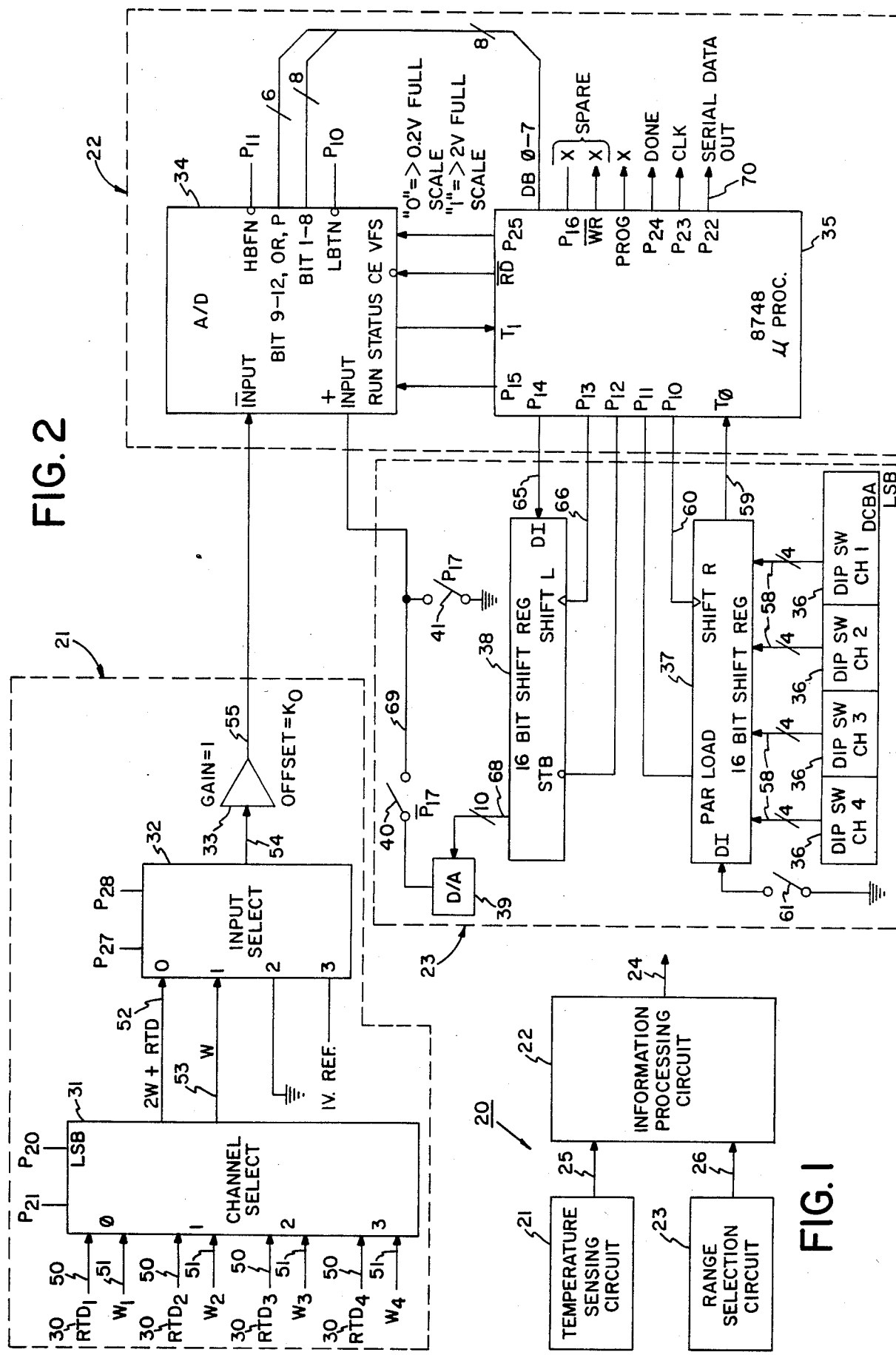

PRECISION TEMPERATURE MEASURING SYSTEM

TECHNICAL FIELD

This invention relates to temperature measuring systems and more particularly to temperature measuring systems incorporating microprocessors and resistance temperature detectors.

BACKGROUND ART

In many manufacturing operations and process control operations, the accurate measurement of temperatures are often required. However, in such industrial environments, precision temperature measurements are difficult to obtain.

In an attempt to resolve this problem and provide industrial manufacturers with systems for accurate temperature measurements, prior art equipment has been developed. One such major advance was the development of resistance temperature detectors (RTDs) for industrial use. These RTDs are immersed in the medium, the temperature of which is to be measured, and produce an output voltage which is a direct measuring resistance, which is a direct function of the temperature being measured. Then, using either a standard table of values or the quadratic equation which represents the relationship between the resistance and the temperature, the actual temperature is determined.

Although these prior art resistance temperature detectors are conventionally employed to provide accurate temperature measurement, and platinum RTDs have become the standard in the industry, the measurements attained are not sufficiently accurate for many applications, due to various inherent difficulties with proper calibration, drift, component aging, undetected resistance levels in the electrical leads, and accurate conversion of resistance to temperature by the operator.

In an attempt to eliminate these inherent difficulties with precision temperature measurements by resistance temperature detectors alone, other prior art systems have been developed which incorporates electronic processing equipment to compensate for the known variables in the resistance temperature detectors, while also converting the resistance value produced to the corresponding temperature. The principal system of the nature is shown in U.S. Pat. No. 4,122,719 issued Oct. 31, 1978, wherein a microprocessor is employed to eliminate measurement errors and provide the requisite calculations to achieve an accurate temperature measurement. However, the system disclosed in U.S. Pat. No. 4,122,719 is extremely expensive and requires operator calibration and monitoring. Consequently, the cost of operating such equipment is also very high.

It is the principal object of the present invention to provide a temperature measuring system which is capable of achieving precision temperature measurements while being comparatively inexpensive to manufacture, install and operate.

Another object of the present invention is to provide a precision temperature measuring system having the characteristic features defined above which is capable of determining temperature measurements over a preselected limited temperature range.

Another object of the present invention is to provide a precision temperature measuring system having the characteristic features defined above which operate automatically, with a minimum of operator control or supervision, and continuously displays and updates a plurality of temperatures.

Other and more specific objects will in part be obvious and will in part appear hereinafter.

DISCLOSURE OF THE INVENTION

The present invention overcomes the prior art difficulties and achieves precise temperature measurements with modestly priced equipment by providing means for selecting the general range within which the temperature reading is known to exist. In this way, the information received from the resistance temperature detectors can be interpreted over a full scale which represents a narrow temperature range. As a result, a more precise temperature measurement is achieved, since each information bit represents a much smaller number than previously attainable with prior art systems.

In employing the pre-selected temperature range information, the system of the present invention is capable of using standard components and obtains optimum operating capabilities therefrom. As a result, an extremely cost efficient system is attained.

In particular, the present invention preferably employs a digital to analog convertor to generate a reference voltage level corresponding to the temperature range selected by the operator for each RTD. This reference voltage is transmitted to a analog to digital convertor, which interprets the incoming signal and uses this level as a comparision for the signal from the RTD probe.

However, in order to attain optimum cost effectiveness from this system, the preferred digital to analog convertor is a ten bit digital to analog convertor, while the analog to digital convertor is a thirteen bit analog to digital convertor. In this way the reference voltage level is generated from a ten bit signal from the microprocessor, but the output level of the digital to analog convertor is interpreted to thirteen bit accuracy by the analog to digital convertor. Then, this thirteen bit signal developed by the analog to digital convertor is used to represent the preselected reference temperature.

In addition, the temperature measuring system of the present invention incorporates the ability to automatically switch and update between a plurality of remote resistance temperature devices, with the system being capable of providing a precise temperature measurement for each one of the plurality of remote resistance temperature devices selected. The system also automatically checks and compensates for line resistance, while also monitoring for changes in line resistance during use.

In the preferred construction, the microprocessor employed in the system of the present invention automatically receives the resistance level generated by the resistance temperature device and produces an output signal representing the precise temperature by solving the quadratic equation which represents the functional relationship between resistance and temperature. This solution is achieved using an iterative process. In this way, the precision of the temperature measured is further enhanced, while eliminating any possibility of error which could result if the operator needed to convert the resistance to a temperature using standard tables or charts.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawing, in which:

FIG. 1 is a block diagram of the precision temperature measuring system of the present invention, and FIG. 2 is a schematic representation of the precision temperature measuring system embodying the unique features of the present invention.

BEST MODE FOR CARRYING OUT THE INVENTION

As shown in FIG. 1, temperature measuring system 20 of the present invention comprises three principal circuit portions which form the overall system. These three portions comprise a temperature sensing circuit 21, an information processing circuit 22, and a range selection circuit 23.

Information processing circuit 22 receives a voltage level input 25 from temperature sensing circuit 21. Input 25 corresponds to the particular resistance sensed by one of a plurality of resistance temperature detectors forming a portion of temperature sensing circuit 21. In addition, information processing circuit 22 also receives a voltage input 26 from range selection circuit 23, which input 26 corresponds to the pre-selected range within which the temperature level being sensed is known to exist.

Once inputs 25 and 26 have been received by information processing circuit 22, input 25 detected by temperature sensing circut 21 is compared to input 26 from range selection circuit 23, processed and converted to an output signal 24 representing the actual temperature sensed. As is more clearly detailed below, range selection circuit 23 allows the information processing circuit 22 to have the equivalent of a "full scale" reading for a narrow temperature range. Typically, each temperature level is determined over a total range of about 100° F. instead of 1,000° F., the entire temperature range of the system. As a result, the limited numbers of bits which represent the input information from the temperature sensing circuit 21 has much greater significance than the identical number of bits would be capable of representing if the full scale range of 0°–1,000° F. were required.

With the limited range established, the input information from temperature sensing circuit 21 is processed through an iterative method, in order to convert the input information to a precise temperature output signal. Once this iterative process is completed, information processing circuit 22 produces an output 24, representing a precise temperature level of the particular medium being sensed.

In FIG. 2, the components forming the three principal circuits of precision temperature measuring system 20 of the present invention is shown. As detailed therein, the temperature sensing circuit 21 of the precision temperature measuring system 20 of the present invention comprises a plurality of resistance temperature detectors 30, a channel selector 31, an input selector 32, and an amplifier 33.

Information processing circuit 22 principally comprises an analog to digital convertor 34 and a microprocessor 35. Finally, range selection circuit 23 comprises a plurality of operator initiatable dip switches 36, two sixteen bit shift registers 37 and 38, a digital to analog convertor 39, and a pair of cooperating switches 40 and 41.

TEMPERATURE SENSING CIRCUIT

In the preferred embodiment, each of the plurality of resistance temperature detectors (RTD) 30 comprises a standard platinum resistor probe, which is well known in the industry and is used as a standard temperature measurement device. In the present invention, each RTD 30 is preferably employed in a three wire RTD connection.

In installation, one wire of each RTD 30 is connected to channel selector 31 by a lead 50. Lead 50 carries the voltage level which represents the resistance drop across the probe caused by the temperature of the medium being sensed. A second wire of each RTD 30 is connected to the channel selector 31 by lead 51, while the third wire of each RTD 30 (not shown) is connected to ground. As will be more fully explained below, this construction provides an inexpensive and efficient method for obtaining a voltage level output from each RTD 30, while also being able to directly determine the wire resistance of each particular RTD 30. Then, with the wire resistance known for the given wire length of each RTD 30, the microprocessor automatically deducts twice the known wire resistance from each input on line 50 to attain the actual voltage level representing the temperature of the medium within which the RTD 30 has been placed. As a result, an efficient and effective measuring system is achieved, while maintaining costs at a minimum.

Channel selector 31 preferably incorporates four independent channels, with two inputs per channel, along with the ability to automatically, continuously cycle from channel to channel in sequence. In the preferred embodiment, channel selector 31 is Model HI-509, manufactured by Harris Corporation.

Channel selector 31 automatically tests lead 50 of each RTD 30 to obtain the voltage level representing the temperature being sensed by that RTD, while continuously shifting from channel to channel, in a sequential loop pattern to obtain the voltage level for each RTD 30. Furthermore, channel selector 31 also tests lead 51 of each RTD 30 in the same continuous, sequential manner. In this way, information processing circuit 22 obtains repeated updates of its information of the wire resistance of each RTD 30, thereby increasing the precision of the system.

Channel selector 31 is connected to input selector 32 by leads 52 and 53, with lead 52 used to transmit the temperature related voltage levels of RTD 30 and lead 53 transmitting the wire resistance information of each RTD 30. Input selector 32 is employed to automatically switch, on command, from transmission of the temperature related information to the wire resistance information, and vice versa.

The information selected is transmitted by input selector 32 to an optional amplifier 33 on lead 54. Amplifier 33, if required, is connected to the analog to digital convertor 34 by lead 55. As a result, the particular output information of input selector 32 is transmitted to analog to digital convertor 34 along lead 54 and 55. In this way, information processing circuit 22 receives the particular voltage level representing the temperature of the particular medium within which each of the RTD probes 30 is immursed, as well as receiving the wire resistance updates for each RTD 30.

RANGE SELECTION CIRCUIT

Range selection circuit 23 incorporates a plurality of dip switches 36, each of which corresponds to one of the available channels in channel selector 31. As discussed above, the preferred embodiment employs four channels and, consequently, four dip switches 36. Although the present invention is not limited to a four channel system, it has been found that four channels provide an efficient, cost effective system whereby precise temperature measurements can be attained without requiring expensive equipment.

Upon start-up of temperature sensing system 20 of the present invention, the operator sets each of the four dip switches 36 with a code corresponding to the temperature range within which the corresponding resistance temperature detector 30 is expected to operate. The particular temperature ranges employed can be altered, depending upon customer requirements. The following table, however, is presented as a representation of a conventional installation and the switch code numbers corresponding to typical temperature ranges:

TABLE I

| Switch Code | Temperature Range (°F.) |
| --- | --- |
| 0 | 0–500 |
| 1 | 0–1000 |
| 2 | 100–199 |
| 3 | 200–299 |
| 4 | 300–399 |
| 5 | 400–499 |
| 6 | 500–599 |
| 7 | 600–699 |
| 8 | 700–799 |
| 9 | 800–899 |

As shown in FIG. 2, dip switches 36 are connected to a 16 bit shift register 37 by leads 58. Once dip switches 36 have been set, each dip switch transmits four bits of information to 16 bit shift register 37 which, upon shift command, on lead 60, transmits the entire 16 bits of information to microprocessor 35 along lead 59. Once received by microprocessor 35, the specific range information for each of the available channels is stored and continuously used by microprocessor 35 in determining the temperature of each resistance temperature detector 30.

In addition, optional switch 61 may be employed to allow the operator to select between temperature output readings in degrees Fahrenheit or degrees Centigrade. If employed, the status of switch 61 would be read by microprocessor 35 and employed in producing the desired output temperature.

The remainder of range selection circuit 23 comprises shift register 38, digital to analog convertor 39, and a pair of cooperating switches 40 and 41. Shift register 38 is connected to microprocessor 35 by leads 65 and 66. Upon receipt of a shift command transmitted on lead 66, data is transmitted on lead 65 from microprocessor 35 to shift register 38.

The information transmitted by microprocessor 35 to shift register 38 on lead 65 is a digital signal representing the range selected by the operator for one of the RTDs 30. This information is then transmitted, upon command, to digital to analog convertor 39 along leads 68. As shown in FIG. 2, ten bits of information are transmitted from shift register 38 to digital to analog convertor 39.

As will be more fully described below, the preferred embodiment employs a ten bit digital to analog convertor 39 in order to provide a cost effective system. The preferred digital to analog convertor is Model AD 7533LN manufactured by Analog Devices Corporation. It has been found that by employing the present invention, a precise temperature reading can be obtained without requiring a digital to analog convertor having capabilities greater than 10 bits.

Digital to analog convertor 39 is connected to analog to digital convertor 34 of information processing circuit 22 by lead 69. In addition, interposed between digital to analog convertor 39 and analog to digital convertor 34 along lead 69 is switch 40 and switch 41. Switch 41 is connected between lead 69 and ground, and operates simultaneously with switch 40 to have an opposite condition.

Upon receipt of the 10 bit digital information from shift register 38, digital to analog convertor 39 outputs an analog voltage level corresponding to the digital input information received from shift register 38. As a result, the analog output signal of digital to analog convertor 39 also represents the limited temperature range selected by the operator during the startup of the system. This analog voltage level signal is transmitted to analog to digital convertor 34 which compares this pre-selected voltage level signal with the actual voltage level signal received on line 55 from the temperature sensing circuit 21.

INFORMATION PROCESSING CIRCUIT

Information processing circuit 22 incorporates analog to digital convertor 34 and a microprocessor 35. Microprocessor 35 is connected to analog to digital convertor 34 to controllably insure its operation and obtain the information developed therein.

In the preferred embodiment, analog to digital convertor 34 is a 13 bit analog to digital convertor having the capacity to receive and process analog information with its digital output being accurate to 13 bits. The preferred unit is Model ICL7109CPL manufactured by Intersil Corporation.

The voltage level inputted to analog to digital convertor 34 on lead 55, representing the unknown temperature of the particular RTD 30 is interpreted by analog to digital convertor 34 to 13 bits of accuracy. Similarly, the voltage level inputted to analog to digital convertor 34 on lead 69, representing the pre-selected temperature range for the RTD 30 being processed at that moment is also interpreted by analog to digital convertor 34 to 13 bits accuracy.

As will be more fully explained below, analog to digital convertor 34 in combination with microprocessor 35 interprets the voltage level inputted on lead 55 in reference to the voltage level inputted on lead 69 and processes the resulting information to determine the precise temperature being sensed by that RTD 30 and then send that information out on lead 70 to visual displays for monitoring by the operator. In the preferred embodiment, the microprocessor 35 comprises Model 8748 manufactured by Intel Corporation.

Operation

The operator's first step is to set the appropriate code on each dip switch 36 to select the particular temperature range for each RTD 30. Once precision temperature measuring system 20 of the present invention is first powered on, the code set on each dip switch 36 is transmitted into shift register 37 along leads 58 and, upon command, all of the four preset codes are transmitted to microprocessor 35 along lead 59. Microprocessor 35 receives the pre-selected temperature range information from shift register 37 and stores this information for future use.

Once the dip switches 36 have been set, temperature measuring system 20 of the present invention operates automatically to determine the temperature being sensed at each channel, display the temperature at each channel, and continuously cycle from channel to channel updating the displayed information. In performing this function, microprocessor 35, which automatically controls the overall operation and information interpretation of temperature measuring system 20, continuously switches the operation of the system between a calibration mode and a temperature measuring mode. This automatic cycling between the calibration mode and the measurement mode occurs after a preset number of temperature updates, preferably occupying a time span of about one to two minutes.

In the calibration mode, microprocessor 35 activates input selector 32 to transmit the wire resistance information received on lead 53. This wire resistance information is transmitted from input selector 32 to analog to digital converter 34 wherein the information is interpreted and transmitted to microprocessor 35 and stored for future use.

As briefly discussed above, microprocessor 35 employs the particular wire resistance obtained for each RTD 30 by subtracting twice the received wire resistance level from the voltage level received directly from each RTD 30. In this way, the amount of resistance generated by the wire length of each RTD 30 is eliminated and a more precise temperature measurement is achieved.

In the preferred embodiment, the calibration mode is also employed for generating the voltage level output from digital to analog converter 39 which corresponds to the preselected temperature range for each of the four channels and storing the corresponding signal received by analog to digital converter 34 in microprocessor 35 for future use. In order to obtain this information, during each calibration mode, microprocessor 35 transmits a ten bit digital signal to shift register 38 along lead 65 which represents the preselected temperature level for one channel.

Since digital to analog convertor 39 is a ten bit d/a convertor, only ten bits of information are transmitted from microprocessor 35 to shift register 38. The remaining six bits of available space in shift register 38 are not used. Two eight bit shift registers are employed only for the economies of costs achieved by using the two eight bit shift registers which remain from the purchase of a standard chip of four eight bit shift registers, two of which are used to form shift register 37.

Upon command, shift register 38 transmits the ten bits of information to digital to analog convertor 39 which generates a voltage level representing the temperature range selected by the operator for that particular channel. This voltage level is then transmitted to analog to digital convertor 34 where its voltage level is interpreted to the thirteen bit accuracy obtainable by the preferred analog to digital convertor 34. This reference voltage level is then transmitted to microprocessor 35 from analog to digital convertor where it is stored for use during the temperature measurement mode.

This process is then repeated for the other three channels, with the particular voltage level measured by the analog to digital convertor 34 being similarly transmitted to microprocessor 35 for future use. During this operation, switch 40 is closed and switch 41 is open. However, during the calibration made when the wire resistance of each RTD 30 is being determined, switches 40 and 41 change states, so that only switch 41 is closed to allow A/D convertor 34 to be connected to the circuit's ground or common point.

Before microprocessor 35 is able to generate a ten bit digital signal which will cause digital to analog convertor 39 to generate a voltage level corresponding to the midpoint of the pre-selected temperature range for each of the channels, microprocessor 35 must determine the unknown operating constants which characterize the particular digital to analog convertor 39 being employed. Once these constants are known, the precise operating characteristics of digital to analog convertor 39 will be known and will be employed with precision.

In one embodiment used to determine the unknown constants, microprocessor 35 assumes the value for each of the constants and inputs a ten bit digital signal into shift register 38 which is then transmitted to digital to analog convertor 39. The resulting voltage level which is transmitted to analog to digital convertor 34 is interpreted by microprocessor 35 and compared to the temperature which microprocessor 35 had assumed the ten bit signal should represent. With this information, adjustments are made until the precise value of each of the two unknown constants are determined. Once these values are known, microprocessor 35 stores this information for use in generating all output signals to shift register 39 to assure the accuracy of the output signal has been carefully matched to the operating characteristics of digital to analog convertor 39.

In the preferred embodiment, the digitial information transmitted by microprocessor 35 to shift register 38, and subsequently transmitted to digital to analog convertor 39 for development of the particular voltage level, represents the mid-point in the temperature range selected by the operator. As a result, if the temperature range selected by the operator for a particular channel is, for example, 500° F. to 599° F., the signal transmitted to digital to analog convertor 39 from shift register 38 and the resulting voltage level developed by digital to analog convertor 39, based upon its input information, represents a temperature of about 550° F.

By employing the mid-point of the pre-selected temperature range as the reference point for that temperature range, greater precision is attained in determining the actual temperature being measured. This greater precision is realized since the sign bit, which represents one of the thirteen bits of information available in analog to digital convertor 34, can be employed.

Twelve of the thirteen bits of information available in analog to digital convertor 34 are numeric bits and the thirteenth bit is a sign bit. Consequently, if either the lowest expected temperature (for example −500° F.) or the highest expected temperature (for example −599° F.) were selected as the reference point, all of the unknown voltage levels received by analog to digital convertor 34 from temperature sensing circuit 21 would have the same sign relative to the reference point. However, by employing the mid-point (for example −550° F.) as the reference voltage to which the unknown voltage level input from temperature sensing circuit 21 is compared, the unknown voltage level may be either less than or greater than the reference voltage level.

As a result, the actual "full scale" temperature range over which the twelve bits of numeric information are employed is reduced to 50° F., with the sign bit being used to tell microprocessor 35 whether the unknown temperature developed by microprocessor 35 from the input voltage level to analog to digital convertor 34 from temperature sensing circuit 21 is to be added or subtracted to mid-point reference voltage level. By employing this construction, thirteen bit precision is attained for the temperature measurements developed by this system.

It has been found that the present invention attains extremely precise temperature measurements by interpreting the reference voltage output of d/a convertor 39 to thirteen bit accuracy in analog to digital convertor 34, and then employing this interpreted signal as an offset to the actual voltage level received by the analog to digital convertor from the temperature sensing circuit 21. By employing this interpreted offset voltage signal, and repeatedly updating the offset signal in a continuous monitoring manner, the actual temperature being measured is obtained with increased precision. This has never been attainable with any prior art system of comparable cost.

In the operation of the calibration mode, once the wire resistances for each RTD 30 in each channel has been determined and the particular mid-point voltage level for the preselected temperature has been determined and stored in microprocessor 35, precision temperature measuring system 20 automatically shifts from the calibration mode to the temperature measurement mode. In the temperature measurement mode, input selector 32 transmits the measured voltage level from each RTD 30 on each channel in a continuous manner with the measured voltage level being transmitted to analog to digital convertor 34.

Simultaneously, microprocessor transmits its ten bit digital signal to shift register 38 which represents the particular pre-selected offset level for the channel being measured. Shift register 38 transmits this signal to digital to analog convertor 39, and digital to analog convertor 39 generates the corresponding offset voltage level representing the mid-point of the pre-selected temperature range.

Since the preferred analog to digital convertor 34 is a differential analog to digital convertor, the two input signals are interpreted to thirteen bit accuracy, are compared, and the difference or "delta" between the two signals is transmitted to microprocessor 35. Microprocessor 35 adds the thirteen bit "delta" signal to the thirteen bit signal which represents the mid-point of the pre-selected temperature range for that particular channel and was generated during the calibration made. This resulting thirteen bit signal, which represents the actual temperature being sensed by the RTD probe 30 on that channel, is then processed by microprocessor 35 into an actual temperature signal.

As is well known to one of ordinary skill in this art, the actual temperature is determined using the iterative process to solve the quadratic equation which represents the resistance temperature curve of the standard RTD probe 30. Once this temperature has been established by microprocessor 35, the signal representing this temperature level is transmitted on line 70 to a display corresponding to the channel being measured. This process is then repeated for each of the other channels and continuously repeated in a sequential manner.

In order to increase the precision of the temperature measurement produced by system 20, the temperature measurement made continues in a repeating cyclical manner in order to continuously update the output temperature display for each channel. Preferably, about two updates per channel per second are achieved. As a result, the temperature measuring system of this invention assures that a precise temperature level for each channel is constantly provided, so that even minor temperature changes at any monitored location will be quickly and precisely known to the operator.

As is readily apparent to one having ordinary skill in this art, the operation of the preferred embodiment of the present invention, as set out above, does not represent the only manner in which the present invention can operate. Variations of operation or system construction may be made without departing from the scope of the present invention.

As is readily apparent from the preceding description, although various changes may be made to the actual components employed or to the overall process in which these components operate, all such systems which employ the use of a reference voltage which can be read, interpreted and employed by an analog to digital convertor and microprocessor to thirteen bit accuracy, even though the information used to generate the reference voltage signal is substantially less than a thirteen bit signal, all encompass the concept of the present invention and would be within the scope hereof.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limited sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patents is:

1. A precision temperature measuring system for determining and monitoring a plurality of temperatures comprising:
   (A) a temperature sensing circuit incorporating
      (1) a plurality of temperature detectors, each having an electrical resistance that varies with temperature, and
      (2) multiplexing means for receiving input signals from the plurality of resistance temperature detectors and sequentially selecting these input signals for subsequent transmission;
   (B) a range selection circuit incorporating,
      (1) manually operable switch means for pre-selecting a desired temperature range which each particular resistance temperature detector is to monitor, and
      (2) signal generating means for receiving the pre-selected temperature ranges and generating output signals representing the pre-selected ranges, the signal generating means comprising a digital-to-analog (D/A) converter that is responsive to the plurality of temperature range signals and which is capable of generating the corresponding analog output signal representative of any such output range signal; and (C) an information processing circuit connected to the temperature sensing circuit for receipt of the sequentially selected input signals and also connected to the range selection circuit for receiving the output signals therefrom, said information processing circuit having means for generating the temperature range signals and further having means for interpreting the received signals from the multiplexing means and processing these signals to develop a plurality of temperature output signals, each temperature output signal representing a temperature being monitored by a corresponding resistance temperature detector, wherein the information processing circuit includes an analog-to-digital (A/D) converter, connected to the microprocessor, for receipt of the signals from the multiplexing means, the microprocessor having means for controlling the operation of the A/D converter so as to generate a digital output signal which is based upon the difference of the received multiplexed input signals in comparison to the temperature range signal; whereby an efficient and effective temperature sensing system is obtained for generating output signals for each of the plurality of resistance temperature detectors by having the corresponding input signal processed over a corresponding pre-selected temperature range.

2. The precision temperature measuring system defined in claim 1, wherein the temperature sensing circuit is further defined as comprising a plurality of three wire resistance temperature detectors,
  1. wherein first and second wires of each three wire detector are connected to the multiplexing means,
  2. wherein the first wire carries a voltage signal representing the temperature responsive resistance of the detector, and
  3. wherein the scond wire carries a signal representing the wire resistance of said wires, and the multiplexing means is further defined as comprising
    1. one channel for each of the plurality of resistance temperature detectors with each of the channels having the two wire inputs of the detector wires connected thereto, and
    2. selecting means for alternately switching between the two wire inputs connected to each of the plurality of separate channels.

3. The precision temperature measuring system defined in claim 1, wherein said digital to analog convertor is a ten bit digital to analog convertor.

4. The precision temperature measuring system defined in claim 3, wherein the plurality of temperature range signals generated by the microprocessor each comprise ten data bits and wherein each of said signals represents the midpoint of the corresponding temperature range preselected by the operator by said switch means.

5. A temperature measuring system for precisely determining and monitoring a plurality of temperatures, comprising:
  A. a temperature sensing circuit incorporating
    a. plurality of temperature detectors characterized by each having an electrical resistance which varies with temperature, each detector comprising a first wire representing the temperature responsive resistance of the detector and a second wire representing the wire resistance of the detector,
    b. a channel selector having a plurality of separate and distinct channels with each of said resistance temperature detectors' first and second wires connected to one of said channels, the channel selector sequentially switching between channels for transmission of signals received on each channel, and
    c. an input selector for alternately selecting between the first and second wires on the selected sequentially switched channel;
  B. an information processing circuit incorporating
    a. an analog to digital (A/D) convertor having thirteen bit accuracy, said A/D convertor connected to the selected wire of the selected channel from the input selector so as to generate a digital signal representative of the temperature of the corresponding temperature detector; and
    b. a microprocessor connected to the analog to digital convertor for control of the A/D convertor; and
  C. a range selection circuit incorporating
    a. a plurality of switches, one for each resistance temperature detector, responsive to operator initiated coding for preselection of a particular temperature range corresponding to the temperature range within which a particular resistance temperature detector is expected to be monitoring,
    b. a first shift register for receiving the preselected temperature ranges for each of the resistance temperature detectors and for transmitting this information to the microprocessor,
    c. a second shift register responsive to receipt of digital information from the microprocessor representing a particular temperature range for a particular resistance temperature detector, and
    d. a digital to analog convertor having an output connected to the analog to digital convertor of the information processing circuit
      1. for receipt of the temperature range signal from the second shift register, and
      2. for generating a corresponding voltage level on said output.

6. The temperature measuring system defined in claim 5, wherein said digital to analog convertor comprises a ten bit digital to analog convertor, and wherein the digital information generated by the microprocessor and transmitted to the second shift register represents the midpoint of the preselected temperature range.

7. A precision temperature measuring system as defined in claim 5 wherein the microprocessor further generates a command signal and wherein the command signal is connected to the input selector, and further wherein the input selector has means for receipt of said command signal so as to control the alternate selection of the first and second wires.

* * * * *